(12) United States Patent
Matthijsse et al.

(10) Patent No.: US 9,459,400 B2
(45) Date of Patent: Oct. 4, 2016

(54) MULTIMODE OPTICAL FIBRE

(71) Applicant: Draka Comteq B.V., Amsterdam (NL)

(72) Inventors: Pieter Matthijsse, Hapert (NL); Mattheus Jacobus Nicolaas van Stralen, Tilburg (NL); Mark Peter Marie Jetten, Haelen (NL); Gert-jan Krabshuis, Sint-Oedenrode (NL)

(73) Assignee: Draka Comteq, B.V., Amsterdam (NL)

( * ) Notice: Subject to any disclaimer, the term of this patent is extended or adjusted under 35 U.S.C. 154(b) by 0 days.

(21) Appl. No.: 14/448,156

(22) Filed: Jul. 31, 2014

(65) Prior Publication Data

US 2014/0341520 A1 Nov. 20, 2014

Related U.S. Application Data

(60) Continuation of application No. 12/185,463, filed on Aug. 4, 2008, now Pat. No. 8,794,038, which is a division of application No. 10/899,005, filed on Jul. 27, 2004, now Pat. No. 7,421,172.

(30) Foreign Application Priority Data

Jul. 28, 2003 (NL) .................................... 1024015

(51) Int. Cl.
*G02B 6/02* (2006.01)
*G02B 6/028* (2006.01)
*C03B 37/018* (2006.01)
*G02B 6/036* (2006.01)

(52) U.S. Cl.
CPC ..... *G02B 6/02047* (2013.01); *C03B 37/01807* (2013.01); *G02B 6/0281* (2013.01); *G02B 6/0288* (2013.01); *G02B 6/036* (2013.01); *C03B 2201/10* (2013.01); *C03B 2201/12* (2013.01); *C03B 2201/24* (2013.01); *C03B 2201/28* (2013.01); *C03B 2201/30* (2013.01); *C03B 2201/31* (2013.01); *C03B 2201/32* (2013.01); *C03B 2201/40* (2013.01); *C03B 2201/42* (2013.01); *C03B 2203/26* (2013.01)

(58) Field of Classification Search
None
See application file for complete search history.

(56) References Cited

U.S. PATENT DOCUMENTS

| | | | |
|---|---|---|---|
| 3,989,350 A | 11/1976 | Cohen et al. | |
| 4,111,525 A | 9/1978 | Kaminow et al. | |
| 4,114,980 A | 9/1978 | Asam et al. | |
| 4,184,744 A | 1/1980 | Onoda et al. | |
| 4,194,807 A | 3/1980 | Gliemeroth | |
| 4,222,631 A | 9/1980 | Olshansky | |
| 4,229,070 A | 10/1980 | Olshansky et al. | |
| 4,230,396 A | 10/1980 | Olshansky et al. | |
| 4,339,174 A | 7/1982 | Levin | |
| 4,372,647 A | 2/1983 | Okamoto et al. | |
| 4,406,517 A | 9/1983 | Olshansky | |
| 4,432,606 A | 2/1984 | Blair | |
| 4,465,335 A | 8/1984 | Eppes | |
| 4,616,901 A | 10/1986 | MacChesney et al. | |
| 4,636,235 A | 1/1987 | Glessner et al. | |
| 4,636,236 A | 1/1987 | Glessner et al. | |
| 4,715,695 A | 12/1987 | Nishimura et al. | |
| 4,723,828 A | 2/1988 | Garel-Jones et al. | |
| 4,802,733 A | 2/1989 | Bachmann et al. | |
| 4,840,653 A | 6/1989 | Rabinovich | |
| 5,142,603 A | 8/1992 | Forrester | |
| 5,381,503 A | 1/1995 | Kanamori et al. | |
| 5,702,497 A | 12/1997 | Oh et al. | |
| 5,841,933 A | 11/1998 | Hoaglin et al. | |
| 6,002,818 A | 12/1999 | Fatehi et al. | |
| 6,185,346 B1 | 2/2001 | Asawa et al. | |
| 6,292,612 B1 | 9/2001 | Golowich et al. | |
| 6,434,309 B1 | 8/2002 | Abbott, III et al. | |
| 6,438,303 B1 | 8/2002 | Abbott, III et al. | |
| 6,470,126 B1 | 10/2002 | Mukasa | |
| 6,574,403 B1 | 6/2003 | Golowich et al. | |
| 6,577,800 B2 | 6/2003 | Sarchi et al. | |
| 6,580,863 B2 | 6/2003 | Yegnanarayanan et al. | |
| 6,606,437 B1 | 8/2003 | Mukasa et al. | |
| 6,724,965 B2 | 4/2004 | Abbott, III et al. | |
| 6,724,966 B2 | 4/2004 | Mukasa | |
| 6,735,985 B2 | 5/2004 | DiGiovanni et al. | |
| 6,750,294 B2 | 6/2004 | Sugiyama et al. | |
| 6,771,865 B2 | 8/2004 | Blaszyk et al. | |
| 6,790,529 B2 | 9/2004 | Pleunis et al. | |
| 6,873,775 B2 | 3/2005 | Jane et al. | |
| 6,904,218 B2 | 6/2005 | Sun et al. | |

(Continued)

FOREIGN PATENT DOCUMENTS

| | | |
|---|---|---|
| EP | 0883002 A1 | 12/1998 |
| EP | 1156019 A2 | 11/2001 |

(Continued)

OTHER PUBLICATIONS

Sasaki, P.L. Francois, D.N. Payne, "Accuracy and resolution of preform index-profiling by the spatial-filtering method," ECOC'81, 6.4-1, Copenhagen, Denmark.

Kashima et al., "Transmission characteristics of graded-index optical fibers with a lossy outer layer," Applied Optics USA, vol. 17, No. 8, Apr. 15, 1978.

Jacomme, "Modal dispersion in multimode graded-index fibers," Applied Optics USA, vol. 14, No. 11, Nov. 1, 1975, pp. 2578-2584.

Okamoto et al., "Computer-Aided Synthesis of the Optimum Refractive-Index Profile for a Multimode Fiber," IEEE Transaction on Microwave Theory and Techniques, USA, vol. MTT-25, No. 3, Mar. 1977, pp. 1-10.

(Continued)

*Primary Examiner* — Sung Pak
(74) *Attorney, Agent, or Firm* — Additon, Higgins & Pendleton, P.A.

(57) ABSTRACT

The invention relates to a multimode optical fiber having a refractive index profile, comprising a light-guiding core surrounded by one or more cladding layers. The present invention furthermore relates to an optical communication system comprising a transmitter, a receiver and a multimode optical fiber.

10 Claims, 3 Drawing Sheets

(56) References Cited

U.S. PATENT DOCUMENTS

| | | |
|---|---|---|
| 7,006,751 B2 | 2/2006 | Provost et al. |
| 7,043,126 B2 | 5/2006 | Guan et al. |
| 7,043,128 B2 | 5/2006 | DiGiovanni et al. |
| 7,068,895 B2 | 6/2006 | Kuijpers et al. |
| 7,089,765 B2 | 8/2006 | Schaper et al. |
| 7,116,877 B2 | 10/2006 | Kuijpers et al. |
| 7,315,677 B1 | 1/2008 | Li et al. |
| 7,406,235 B2 | 7/2008 | Guan et al. |
| 7,421,172 B2 | 9/2008 | Matthijse et al. |
| 7,421,174 B2 | 9/2008 | Fleming, Jr. et al. |
| 7,539,381 B2 | 5/2009 | Chen et al. |
| 7,646,955 B2 | 1/2010 | Donlagic |
| 7,783,149 B2 | 8/2010 | Fini |
| 7,787,731 B2 | 8/2010 | Bookbinder et al. |
| 7,826,691 B2 | 11/2010 | Matthijsse et al. |
| 7,878,712 B2 | 2/2011 | Shimotakahara et al. |
| 7,903,918 B1 | 3/2011 | Bickham et al. |
| 8,794,038 B2 | 8/2014 | Matthuse et al. |
| 2002/0102082 A1 | 8/2002 | Sarchi et al. |
| 2002/0170321 A1* | 11/2002 | Kuijpers ............... G02B 6/0288 65/419 |
| 2002/0176678 A1 | 11/2002 | Mukasa |
| 2002/0197038 A1 | 12/2002 | Abbott, III et al. |
| 2003/0024276 A1 | 2/2003 | Anderson et al. |
| 2004/0028360 A1* | 2/2004 | Pleunis ................. G01M 11/33 385/123 |
| 2005/0000253 A1 | 1/2005 | Xie et al. |
| 2005/0008312 A1 | 1/2005 | Jang et al. |
| 2005/0063653 A1 | 3/2005 | Matthijse et al. |
| 2005/0063712 A1* | 3/2005 | Rice ................... H04B 10/2581 398/200 |
| 2005/0238306 A1 | 10/2005 | Breuls et al. |
| 2007/0183728 A1 | 8/2007 | Breuls et al. |
| 2009/0019894 A1 | 1/2009 | Matthijse et al. |
| 2009/0059353 A1 | 3/2009 | Fini |
| 2009/0092365 A1 | 4/2009 | Donlagic |
| 2009/0154888 A1 | 6/2009 | Abbott, III et al. |
| 2009/0169163 A1 | 7/2009 | Abbott, III et al. |
| 2010/0021170 A1 | 1/2010 | Lumineau et al. |
| 2010/0028020 A1 | 2/2010 | Gholami et al. |
| 2010/0040336 A1 | 2/2010 | Chen et al. |
| 2010/0067858 A1 | 3/2010 | Kim et al. |
| 2010/0171945 A1 | 7/2010 | Gholami et al. |
| 2010/0220966 A1 | 9/2010 | Bennett |
| 2010/0254653 A1 | 10/2010 | Molin et al. |
| 2010/0310218 A1 | 12/2010 | Molin et al. |
| 2011/0037183 A1 | 2/2011 | Tudury et al. |
| 2011/0044594 A1 | 2/2011 | Tudury et al. |
| 2011/0044596 A1 | 2/2011 | Zhang et al. |
| 2011/0054861 A1 | 3/2011 | Lane |
| 2011/0054862 A1 | 3/2011 | Pimpinella et al. |
| 2011/0058781 A1 | 3/2011 | Molin et al. |
| 2011/0064367 A1 | 3/2011 | Molin et al. |

FOREIGN PATENT DOCUMENTS

| | | |
|---|---|---|
| EP | 1503230 A1 | 2/2005 |
| GB | 2129152 A | 5/1984 |
| JP | 6-216440 | 8/1994 |
| JP | 08-304636 A | 11/1996 |
| JP | 9-048629 | 2/1997 |
| JP | 11-064665 A | 3/1999 |
| JP | 2000-347057 A2 | 12/2000 |
| JP | 2002-318315 A | 10/2002 |
| JP | 2006-047719 A | 2/2006 |
| JP | 2006-078543 A | 3/2006 |
| JP | 2006-227173 A | 8/2006 |
| KR | 10-2001-0113708 A | 12/2001 |
| KR | 2001-113694 A1 | 12/2006 |
| NL | 1022315 | 7/2004 |
| WO | 00/50936 A1 | 8/2000 |
| WO | 00/50941 A | 8/2000 |
| WO | 02/070416 A1 | 9/2002 |
| WO | PCT/NL02/00604 | 3/2003 |
| WO | 03/081301 A1 | 10/2003 |
| WO | 2005/106544 A1 | 11/2005 |
| WO | 2009/078962 A1 | 6/2009 |
| WO | 2010/036684 A2 | 4/2010 |
| WO | 2011/040830 A1 | 4/2011 |

OTHER PUBLICATIONS

Donalagic, "Opportunities to Enhance Multimode Fiber Links by Application of Overfilled Launch," Journal of Lightwave Technology, vol. 23, No. 11, (Nov. 2005) pp. 3526-3540.

Morikuni et al., "Simulation-Based Prediction of Multimode Fiber Bandwidth for 10 Gb/s Systems," LEOS 2002, 15th Annual Meeting of IEEE Lasers & Electro-Optics Society, Glascow, Scotland, pp. 1-2.

European Office Action in counterpart European Application No. 04077120 dated Jan. 20, 2011, pp. 1-4.

Kaminow et al., "Profile synthesis in multicomponent glass optical fibers," Applied Optics, vol. 16, No. 1, Jan. 1977, pp. 108-112 [cited in European Office Action].

Mahlke et al., "Fiber Optic Cables", 2nd Edition, (1993), ISBN 3-8009-4127-9, pp. 42-45.

European Search Report and Written Opinion for corresponding European Application No. 04077120, dated Oct. 18, 2004.

Dutch Search Report and Written Opinion for corresponding Dutch Application No. 1024015, dated Jul. 28, 2003.

European Office Action for corresponding European Application No. 04077120, dated Nov. 26, 2007.

First Chinese Office Action for corresponding Chinese Application No. 200410068412.5, dated Jul. 13, 2007.

Hackert, Michael J., "Explanation of Launch Condition Choice for GRIN Mulitmode Fiber Attenuation and Bandwidth Measurements", Journal of Lightwave Technology, Feb. 1992, vol. 10, No. 2, pp. 125-129.

European Office Action in counterpart European Application No. 04077120.6 dated May 21, 2010, pp. 1-4.

European Patent Office Minutes of the Oral Proceedings in counterpart European Application No. 04077120 dated Feb. 17, 2012, pp. 1-7.

European Patent Office Summons to attend Oral Proceedings in counterpart European Application No. 04077120 dated Oct. 14, 2011, pp. 1-5.

Korean Office Action in counterpart Korean Application No. 10-2004-0058614 date Jan. 6, 2012, pp. 1-6.

English-translation of Korean Office Action in counterpart Korean Application No. 10-2004-0058614 date Jan. 6, 2012, pp. 1-5.

Gloge et al., "Multimode Theory of Graded-Core Fibers", Bell System Technical Journal, vol. 52, No. 9, Nov. 1, 1973, pp. 1563-1578.

Irven et al., "Long Wavelength Performance of Optical Fibres Co-Doped with Fluorine", Electronic Letters 8th, vol. 17, No. 1, pp. 3-5, (Jan. 1981).

Korean Office Action in counterpart Korean Application No. 10-2012-0046914 dated Aug. 10, 2012, pp. 1-6.

English-translation of Korean Office Action in counterpart Korean Application No. 10-2012-0046914 dated Aug. 10, 2012, pp. 1-5.

European Patent Office Decision to grant a European patent in counterpart European Application No. 04077120.6 dated Sep. 20, 2012, pp. 1-2.

European Patent Office Intention to Grant in counterpart European Application No. 04077120.6 dated May 4, 2012, pp. 1-40.

Korean Office Action in counterpart Korean Application No. 10-2004-0058614 dated Feb. 11, 2011, pp. 1-6.

* cited by examiner

MULTIMODE OPTICAL FIBRE

CROSS-REFERENCE TO PRIORITY APPLICATIONS

This application is a continuation of commonly assigned U.S. application Ser. No. 12/185,463 for a Method for Manufacturing a Multimode Optical Fibre, filed Aug. 4, 2008, now U.S. Pat. No. 8,794,038, which is a division of commonly assigned U.S. application Ser. No. 10/899,005 for Multimode Optical Fibre Having a Refractive Index Profile, Optical Communication System Using Same and Method for Manufacturing Such a Fibre, filed Jul. 27, 2004, now U.S. Pat. No. 7,421,172, which claims the benefit of Dutch Application No. 1024015 (filed Jul. 28, 2003, at the Dutch Patent Office).

FIELD OF THE INVENTION

The present invention relates to a multimode optical fibre having a refractive index profile, comprising a light-guiding core surrounded by one or more cladding layers. The present invention furthermore relates to an optical communication system comprising a transmitter, a receiver and a multimode optical fibre. In addition to that, the present invention relates to a method for manufacturing a multimode optical fibre having a refractive index profile, wherein doped or undoped glass layers are deposited on the interior of a substrate tube by means of a chemical vapour deposition technique, using a reactive gas mixture, so as to obtain a preform having a precisely defined refractive index profile, from which preform a multimode optical fibre is drawn by heating one end of the preform, as well as to a multimode optical fibre having a refractive index profile, comprising a light-guiding gradient index core built up from a number of dopants.

BACKGROUND OF THE INVENTION

A multimode optical fibre is known per se from U.S. Pat. No. 4,339,174, which employs a bandwidth of at least 700 MHz. The optical fibre that is known therefrom comprises three separate regions, viz. an outer cladding layer, a barrier layer disposed on the inside wall surface of the cladding layer, and a core of a very pure glass with a refractive index profile disposed within the barrier layer, wherein the core comprises $SiO_2$ doped with a sufficient amount of a first oxide for increasing the index of refraction of the core to a value higher than that of the cladding layer, wherein the first oxide concentration varies according to a specific profile. For a multimode optical fibre having a core diameter of 64.0 μm and a numerical aperture of 0.207, bandwidths (MHz) of 1024 and 1082 have been measured for wavelengths of 900 nm and 1300 nm, respectively. Further details with regard to the transmission capacity are not provided therein.

From U.S. Pat. No. 3,989,350 there is known a multimode optical fibre having a refractive index profile for modal dispersion reduction with a view to widening the usable bandwidth of an optical communication system. The multimode optical fibre that is known therefrom comprises a core having an index of refraction which radially decreases from the fibre axis to the region at the core circumference, the core essentially consisting of $SiO_2$ and at least one refractive index modifying substance, in particular a radially increasing concentration of boron oxide, wherein the final composition at the core circumference essentially comprises boron silicate containing from 10 mole percent $B_2O_3$ to 20 mole percent $B_2O_3$. Further details with regard to the bandwidth or the transmission capacity are not provided.

From U.S. Pat. No. 4,222,631 there is known a multimode optical fibre comprising at least three glass-forming compounds and having a core with a radially gradient refractive index profile and a cladding, wherein the refractive index profile varies according to a specific formula as a function of the radius. Specific details with regard to the bandwidth or the transmission capacity are not provided.

Because of the continuous growth in data communication and telecommunication, there is a need for communication systems and glass fibres having a high transmission capacity. One way of increasing the transmission capacity of a glass fibre (system) is to use so-called Wavelength Division Multiplexing (WDM), wherein several signals are simultaneously transmitted through a glass fibre at different wavelengths. Because of the expensive peripheral equipment that is needed, this technique is mainly used in long-distance networks, in which single mode fibres are used.

Also in local networks (LANs), storage networks (SANs) and connecting networks, however, in which multimode fibres are frequently used in view of the relatively short distances and the large number of connections, there is a growing need for a high transmission capacity to be realised by means of WDM techniques. In addition to that, there is a tendency to use lasers without temperature stabilisation in the aforesaid short-distance networks, which is significantly cheaper than using temperature-stabilised lasers. With such lasers without temperature stabilisation, a shift in the laser wavelength will take place in the case of temperature changes. Both the use of WDM techniques and the use of lasers that are not temperature-stabilized requires that the bandwidth of multimode fibres be sufficiently high over a relatively large wavelength range for the transmission rates that are to be used.

Multimode glass fibres having a high bandwidth suitable for high transmission rates can be produced by introducing a very precisely defined refractive index profile into the fibre. Previously published International application PCT/NL02/00604 filed in the name of the present applicant, for example, indicates that the refractive index profile of such fibres must be exactly in accordance with the equation according to formula (1):

$$n(r) = n_1 \sqrt{1 - 2\Delta\left(\frac{r}{a}\right)^\alpha} \quad (1)$$

wherein:
$n_1$=the refractive index value of the fibre core
r=the radial position in the fibre core (μm)
$\Delta$=the refractive index contrast of the fibre
$\alpha$=the profile shape parameter
a=the fibre core radius (μm)

Said International application furthermore indicates that an adequate control of the inner part of the optical core is important. Lasers are generally used with the desired high transmission rates, which lasers, because of the spot size, only "expose" part of the optical core, so that more stringent requirements are made as regards an adequate profile control.

According to the method that is known from PCT/NL02/00604 it is possible to produce multimode fibres having a high bandwidth at one particular wavelength for which the fibre was designed. Such a fibre is suitable for high transmission rates at that particular wavelength. When the fibre is used with wavelengths different from the design wavelength (both higher and lower), the bandwidth is significantly lower, as a result of which the maximum transmission rate is lower at wavelengths different from the design wavelength.

SUMMARY OF THE INVENTION

A first aspect of the present invention is to obtain multimode glass fibres that can be used over a relatively large wavelength range at a specific transmission rate.

According to another aspect of the present invention, the multimode fibres preferably have a specific core diameter and numerical aperture and a specific minimum Over Filled Launch (OFL) bandwidth, measured in accordance with FOTP-204, TIA/EIA-455-204.

Another aspect concerns the need for optical communication systems comprising a multimode fibre, which systems have a relatively large wavelength range at a specific transmission rate.

Yet another aspect of the present invention concerns the need for optical communication systems comprising multimode fibres, which systems make it possible to use lasers that are not temperature-stabilized.

Another aspect of the present invention is to provide an optical fibre having a sufficiently high bandwidth in a specific wavelength range, e.g. around 800 nm, for realising a specific transmission capacity.

Another aspect of the present invention comprises the provision of a multimode optical fibre that is compatible with the multi-mode fibres that are already installed.

According to the present invention, the multimode optical fibre as referred to in the introduction is characterized in that the transmission capacity is at least 1 Gbit/sec over a wavelength band having a width of at least 100 nm in a wavelength range comprising 1300 nm, and that over a fibre length of at least 1000 m.

According to another embodiment, the transmission capacity is at least 10 Gbit/sec over a wavelength band having a width of at least 50 nm, in particular a width of at least 100 nm, in a wavelength range comprising 850 nm, and that over a fibre length of at least 150 m.

A special embodiment of a multimode optical fibre according to the present invention is characterized in that the transmission capacity is at least 1 Gbit/sec over a wavelength band having a width of at least 250 nm in a wavelength range comprising 1400 nm, and that over a fibre length of at least 850 m.

Since it is very desirable that such multimode fibres are compatible with the multimode fibres that are already installed, the fibre preferably has a core diameter of 62.5 μm, the numerical aperture ranges from 0.25 to 0.30 and the minimum OFL bandwidth is at least 160 Mhz·km at 850 nm, more in particular, the minimum OFL bandwidth is at least 300 Mhz·km at 1300 nm.

The present invention further relates to a multimode optical fibre having a refractive index profile, comprising a light-guiding core surrounded by one or more cladding layers, which is characterized in that the transmission capacity is at least 1 Gbit/sec over a wavelength band having a width of at least 100 nm in a wavelength range comprising 1300 nm, and that over a fibre length of at least 2000 m.

In a special embodiment of a multimode optical fibre according to the present invention, the transmission capacity is at least 10 Gbit/sec over a wavelength band having a width of at least 50 nm, in particular a width of at least 100 nm, in a wavelength range comprising 850 nm, and that over a fibre length of at least 300 m.

According to yet another embodiment of the present invention, the transmission capacity of the multimode optical fibre is at least 1 Gbit/sec over a wavelength band having a width of at least 250 nm in a wavelength range comprising 1400 nm, and that over a fibre length of at least 1300 m.

Since it is very desirable that such fibres be compatible with the multimode fibres that are already installed, the fibre preferably has a core diameter of 50 μm, the numerical aperture ranges from 0.18 to 0.22 and the minimum OFL bandwidth is at least 400 Mhz·km at 850 nm, more in particular, the minimum OFL bandwidth is at least 400 Mhz·km at 1300 nm.

In order to be able to guarantee such transmission capacities of a graded index multimode optical fibre in various systems that may use lasers having different characteristics, certain models are available that define the minimum OFL bandwidth of the fibres to be used. The OFL bandwidths that are minimally required for the aforesaid combinations of transmission capacity/product/wavelength range are thus known to those skilled in the art.

Furthermore, the present optical fibres must not exhibit any perturbation in the central part of the DMD (Differential Mode Delay) characteristic in the wavelength range to be used. Such perturbations may include: double pulses, pulse widening, leading pulses or trailing pulses.

In the DMD measurement, the impulse response of the transmission of light pulses at different radial positions through the core of a multimode fibre is measured. When using an optical multimode fibre at the aforesaid higher transmission rates, it is important that the impulse response of the light pulses in the central portion of the fibre core having a diameter of 18 μm does not exhibit any perturbation.

The present invention furthermore relates to an optical communication system comprising a transmitter, a receiver and a multimode optical fibre, characterized in that a multimode optical fibre as described above is used as the multimode optical fibre for a transmission of n x at least 1 Gbit/sec, the distance between the transmitter and the receiver being at least 1 km, wherein n>=2.

In specific embodiments the aforesaid optical communication system is preferably characterized in that a multimode optical fibre as described above is used as the multimode optical fibre for a transmission of n x at least 10 Gbit/sec, the distance between the transmitter and the receiver being at least 150 m, wherein n>=2.

For a special optical communication system, a multimode optical fibre as described above is used as the multimode optical fibre for a transmission capacity of n x at least 1 Gbit/sec, the distance between the transmitter and the receiver being at least 850 m, wherein n>=2.

The parameter "n" is to be understood to mean a multichannel optical communication system, whilst furthermore the present invention also relates to a single-channel optical communication system, wherein the transmission capacity is at least 1 Gbit/sec or 10 Gbit/sec, respectively wherein the transmitter is in particular a laser that is not temperature-stabilized. Depending on the magnitude of the wavelength drift of such lasers without temperature stabilisation, the optical communication systems comprising such lasers may also be configured as multichannel systems.

According to the present invention, the multimode optical fibres can be obtained by using two or more dopants for building up the gradient index core of a multimode optical fibre. By varying the concentration of dopants over the core radius, the intermode dispersion characteristics of the multimode optical fibre can be adapted in such a manner that the bandwidth is less wavelength-dependent. By simultaneously defining a very precise refractive index profile, a high bandwidth is obtained over a wide wavelength range.

Preferably, $GeO_2$ and F are used as the dopants in $SiO_2$ for building up the optical core. It is important in this connection that the concentration of F in the optical core of the multimode fibre is lower on the fibre axis (position r=0) than elsewhere in the fibre core (at position 0<r=<a), wherein the edge of the core is defined as r=a. In this way the bandwidth-dependence of the wavelength of the light that is used can be influenced in such a manner that a sufficient production yield of the present fibres can be realised.

Other combinations of dopants in $SiO_2$ may be used in the same manner for influencing the intermode dispersion characteristics of the optical fibre so that the wavelength-dependence of the bandwidth decreases. The dopants that may be used include, besides the aforesaid $GeO_2$ and F: $B_2O_3$, $P_2O_5$, N, $TiO_2$, $ZrO_2$, $SnO_2$ or $Al_2O_3$.

Special embodiments of the multimode optical fibre according to the present invention and of the method for manufacturing such a multimode optical fibre are defined in the subclaims.

The present invention will be explained in more detail hereinafter with reference to a number of figures, in which connection it should be noted, however, that the present invention is by no means limited to such a special figure.

DETAILED DESCRIPTION

Figure 1:
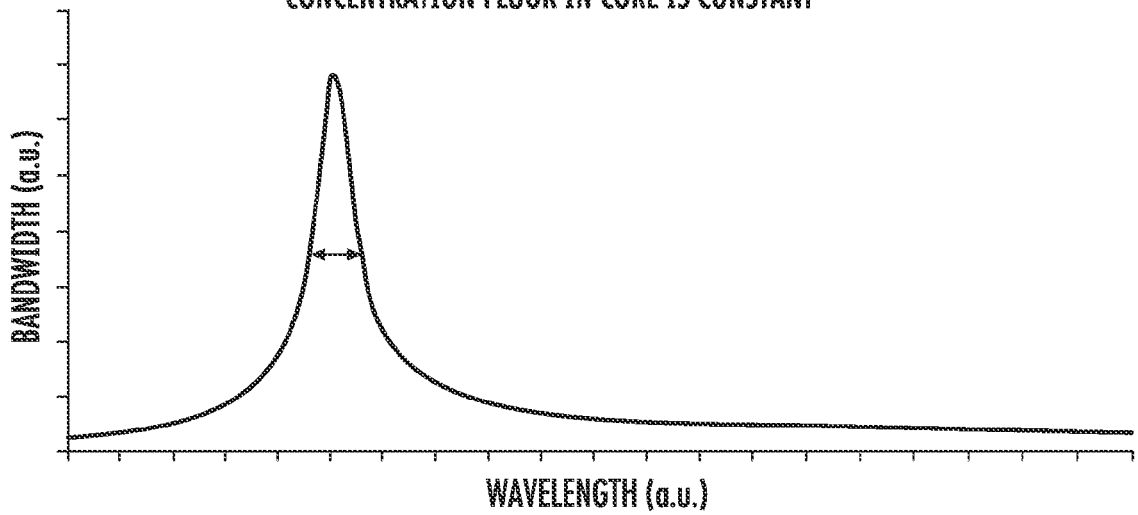
FIG. 1 shows the relation between the wavelength and the bandwidth of a multimode optical fibre according to the prior art.
Figure 2:
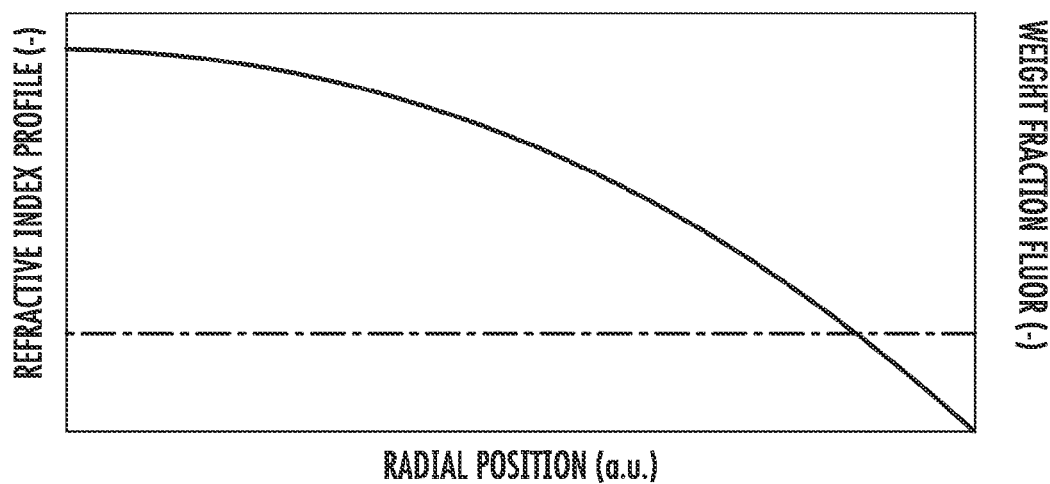
FIG. 2 shows the refractive index profile and the dopant concentration of the optical fibre that is shown in FIG. 1.

FIG. 1 shows the wavelength-dependence of the bandwidth of a multimode optical fibre as known from the prior art. The refractive index profile (full line) and the concentration of F (broken line) of said fibre are shown in FIG. 2. The concentration of F may vary from 0 to about 4 weight percent, and the refractive index profile is formed by having the concentration of a refractive index-increasing dopant, such as $GeO_2$, $P_2O_5$, or combinations thereof, vary along the core radius in accordance with the desired shape of the refractive index profile. The position of the peak of maximum bandwidth in the figure may be shifted to a higher or a lower wavelength by having the concentration of F (which is constant along the radius) increase or decrease or by changing the shape of the refractive index profile, wherein a lower value of the profile parameter α causes the peak to shift to the right. Such shifts of the value of α or of the concentration of F do not lead to significant changes in the shape of the peak that is shown in FIG. 1. Deviations from the ideal refractive index profile according to the formula generally lead to bandwidths that range below the curve of FIG. 1. The curve of FIG. 1 thus shows the maximum bandwidth that can be achieved with a specific wavelength for a fibre of a specific composition.

Figure 3:
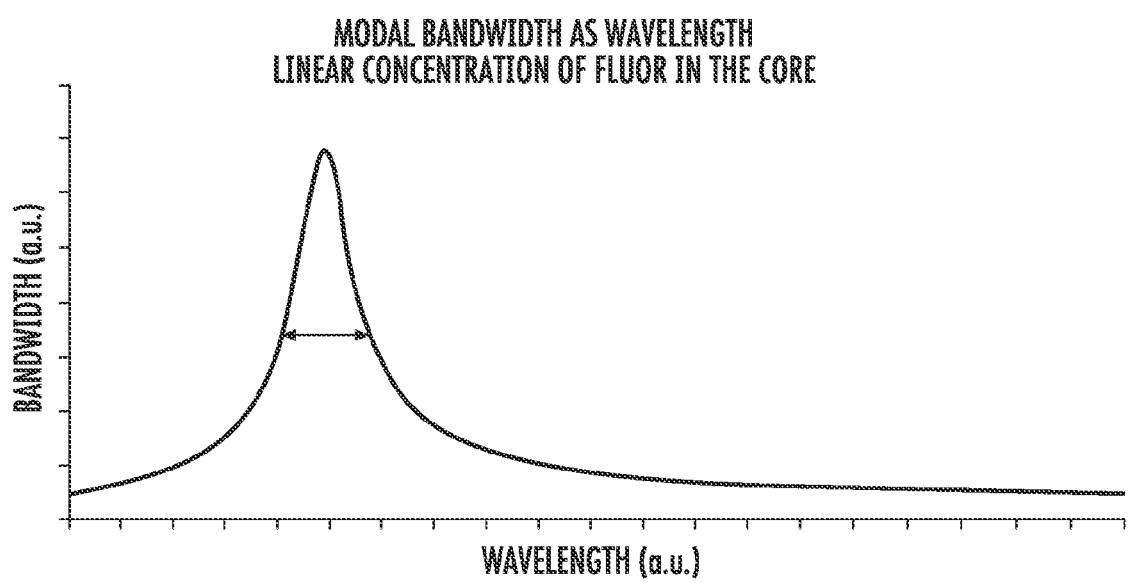
FIG. 3 shows the relation between the wavelength and the bandwidth of another multimode optical fibre according to the present invention.
Figure 4:
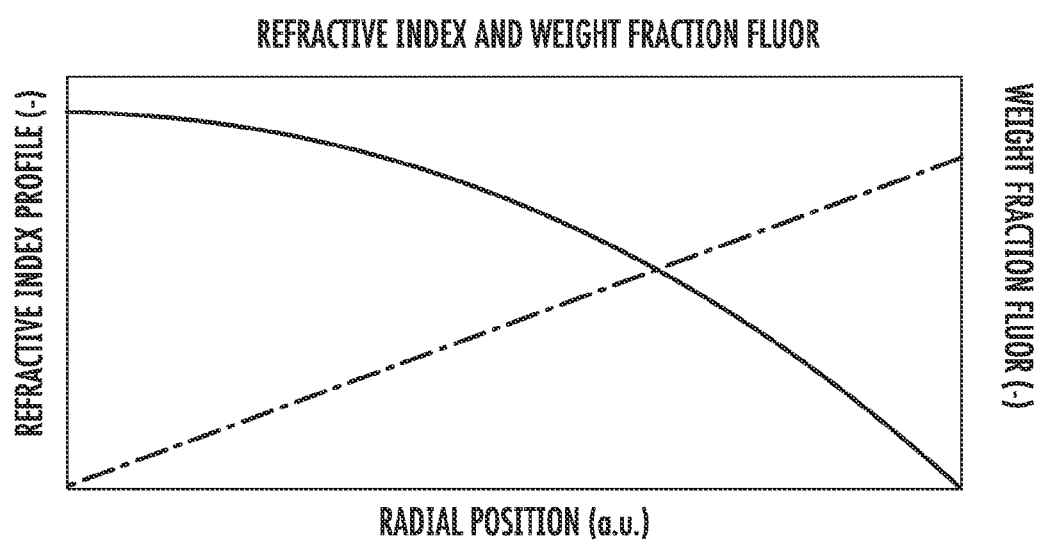
FIG. 4 shows the refractive index profile and the dopant concentration of the multimode optical fibre that is shown in FIG. 3.

FIG. 3 shows an example of the bandwidth-dependence of a multimode optical glass fibre for a multimode optical glass fibre having a refractive index profile (full line) and the concentration of F (broken line) according to the principle of FIG. 4. By having the concentration of F increase in radial direction from the central fibre axis, the dispersion characteristics of the multimode optical fibre are influenced to such an extent that a specific minimum bandwidth is available over a larger wavelength range. The width of the peak at half height is 1.8 times the width in FIG. 1. FIG. 4 shows a linear increase of the concentration of F as a function of the radius in the core of the multi-mode optical glass fibre. Such changes in the wavelength-dependence of the bandwidth also occur in the case of parabolic or exponential increases of the concentration of F as a function of the radius, however.

In the example according to FIG. 4, the concentration of F increases from 0 weight percent on the central fibre axis (at r=0) to a maximum value between approximately 0.5 and 5 weight percent at the edge of the optical core (at r=a). By using such a change in the F-dopant concentration e.g. from 0 to 5 weight percent in a standard multimode fibre having a core diameter of 62.5 μm and an NA of about 0.27, an α-value of about 1.97 will result in an optical fibre which is suitable for transmission of at least 1 Gbit/sec over a distance of a 1000 m in a wavelength range comprising 1300 nm. Such a fibre can be used in an optical communication system comprising a transmitter and a receiver, in which simultaneous signal transmission takes place at two or more wavelengths at a transmission rate of at least 1 Gbit/sec over a wavelength band having a width of at least 100 nm for each wavelength over a distance of minimally 1000 m. Such an optical fibre can also be used in an optical communication system comprising a transmitter that is not temperature-stabilised as well as a receiver at a transmission rate of at least 1 Gbit/sec over a distance of at least 1000 m. A similar change in the F-dopant concentration in a standard multi-mode fibre having a core diameter of 50 μm and an NA of about 0.2, likewise at an α-value of about 1.97, provides a fibre which is suitable for transmission of at least 1 Gbit/sec over a distance of 2000 m in a wavelength band having a width of 100 nm in a wavelength range comprising 1300 nm. Such a fibre can be used in an optical communication system comprising a transmitter and a receiver, in which simultaneous signal transmission takes place at two or more wavelengths at a transmission rate of at least 1 Gbit/sec for each wavelength over a distance of minimally 2000 m. Such a fibre can also be used in an optical communication system comprising a transmitter that is not temperature-stabilized as well as a receiver at a transmission rate of at least 1 Gbit/sec over a distance of at least 2000 m.

Figure 6:
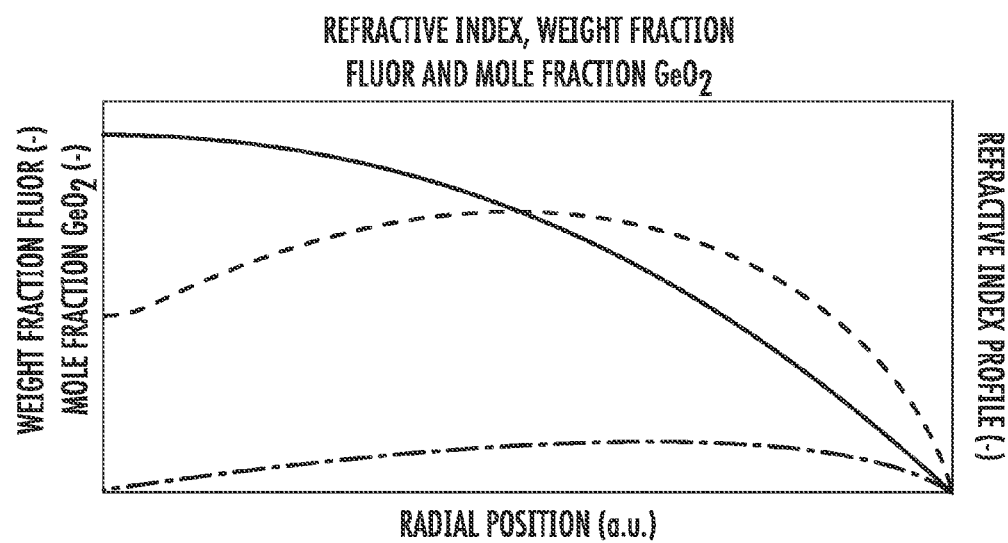
FIG. 6 shows the refractive index profile and the dopant concentration of the multimode optical fibre that is shown in FIG. 5.

The selection of a higher α-value causes the peak of the bandwidth to shift to a lower wavelength. The use of such a change in the F-dopant concentration e.g. from 0 to 1.5 weight percent in a multimode fibre having an α-value of about 2.05 makes it possible to adapt a standard multimode fibre having a core diameter of 62.5 μm and an NA of about 0.27 for transmission of at least 10 Gbit/sec over a distance of 150 m in a wavelength band having a width of 50 nm in a wavelength range comprising 850 nm. A standard multimode fibre having a core diameter of 50 µm and an NA of about 0.2 can thus be adapted for transmission of at least 10 Gbit/sec over a distance of 300 m in a wavelength band having a width of 50 nm in a wavelength range comprising 850 nm. An increase in the difference between the minimum amount of F-dopant and the maximum amount of F-dopant e.g. from 0 to 2 weight percent will result in an extension of the wavelength band within which the fibres are suitable for said transmission rate and said distance. In this case the wavelength band would increase from 50 nm to 100 nm. Said fibres, which are optimised at 850 nm, can be used in an optical communication system comprising a transmitter and a receiver, in which simultaneous signal transmission takes place at two or more wavelengths at a transmission rate of at least 10 Gbit/sec for each wavelength over a distance of at least 150 m. Said fibres can also be used in an optical communication system comprising a transmitter that is not temperature-stabilised as well as a receiver at a transmission rate of at least 10 Gbit/sec over a distance of at least 150 m. It is also possible to obtain the intended effects when using a concentration of F>0 weight percent on the central fibre axis. Thus a change in the concentration of F from 0 to 1 weight percent appears to produce the same results as a change from 0.5 to 1.5 or from 2 to 3 weight percent. A special embodiment is shown in FIG. 6, in which the concentration of F increases in radial direction from the central fibre axis to a specific maximum value of about 0.5-8 weight percent at a radius $r_{max}$ which ranges between 0 and a, and which subsequently decreases from $r_{max}$ to a. By using such a special change in the F-dopant concentration, with a maximum concentration of F-dopant between a radius from 0 to a, standard multimode fibres can be adapted for high transmission rates over a large wavelength band, viz. larger than 250 nm. A standard multimode fibre having a core diameter of 62.5 µm and an NA of about 0.27 becomes suitable for transmission of 1 Gbit/sec over a distance of 850 m over a wavelength band of more than 250 nm. By doping said fibres during manufacture thereof with a thus varying F-dopant concentration, wherein a maximum F-dopant concentration of 5 weight percent is used with a radius r=20 µm, for example, and a concentration of F=0 is maintained in the centre of the core and at the edge of the core, and simultaneously co-doping with a changing concentration of $GeO_2$, it is possible to realise a refractive index profile having a specific α-value. When an α-value of about 2.3 is selected, the wavelength band comprises a width of 250 nm in a wavelength range of 1400 nm.

Similarly, a standard multimode fibre having a core diameter of 50 µm and an NA of about 0.2 is suitable for transmission of 1 Gbit/sec over a distance of 1300 m over a wavelength band of more than 250 nm by doping said fibres during manufacture thereof with such a varying F-dopant concentration, wherein a maximum F-dopant concentration of e.g. 4.5 weight percent is used with r=15 µm, with a refractive index profile having an α-value of about 2.4.

Such fibres can be used in an optical communication system comprising a transmitter and a receiver, in which simultaneous signal transmission takes place at two or more wavelengths at a transmission rate of at least 1 Gbit/sec for each wavelength over a distance of minimally 850 m. Such fibres can also be used in an optical communication system comprising a transmitter that is not temperature-stabilised as well as a receiver at a transmission rate of at least 1 Gbit/sec over a distance of at least 850 m.

The term standard multimode fibre is to be understood to mean a multimode fibre having a core diameter of 50 µm, an OFL-bandwidth of >400 Mhz·km at 850 nm and >400 Mhz·km at 1300 nm; a multimode fibre having a core diameter of 62.5 µm; an OFL-bandwidth of >160 Mhz·km at 850 nm and >300 Mhz·km at 1300 nm.

Figure 5:
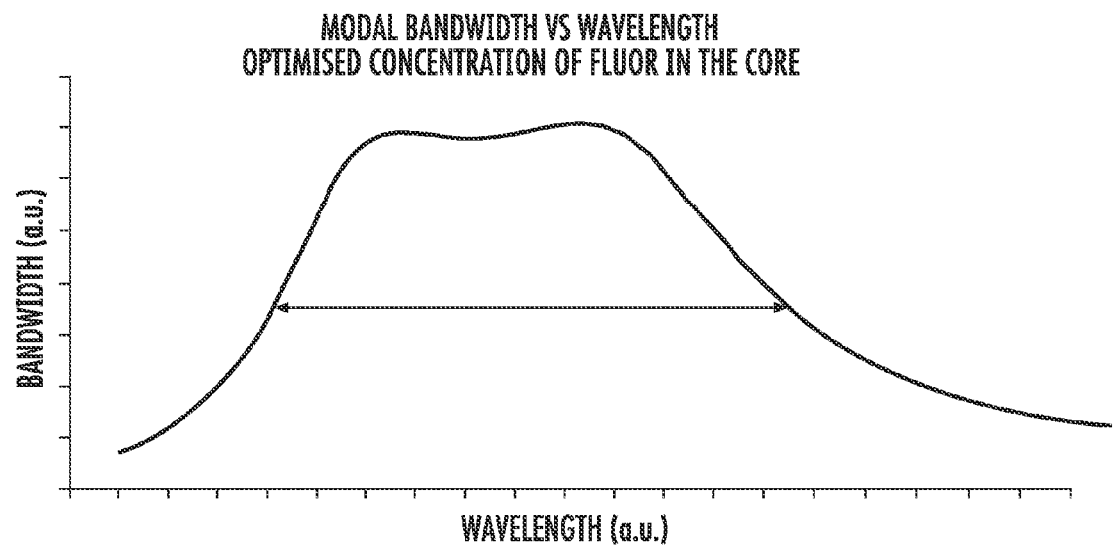
FIG. 5 shows the relation between the wavelength and the bandwidth of yet another multimode optical fibre according to the present invention.

FIG. 5 shows an example of the bandwidth-dependence of a multimode optical glass fibre for a multimode optical glass fibre comprising a mole fraction $GeO_2$ (dashed line), a refractive index profile (full line) and a concentration of F (broken line) according to the principle of FIG. 6. In this way it appears to be possible to obtain a specific minimum bandwidth over an even larger wavelength range; the width at half height of the "peak" in FIG. 5 is 10.8 times the width according to the prior art as shown in FIG. 1. Several production processes exist that are capable of incorporating the aforesaid F-dopants in the core of a multimode fibre. Because of the higher incorporation efficiency for fluorine (F), the PCVD process is very suitable for this purpose. In this process, glass layers are deposited on the inside of a substrate tube via a deposition process, which glass layers will form the core of the multimode fibre. The gaseous process gases are supplied at the inlet side of the tube and react to form a thin layer of glass on the inside of the tube under the influence of a reciprocating low-pressure plasma generated in the tube. A thin layer of glass is deposited with every stroke of the plasma. By varying the concentrations of the raw materials in the gas flow being supplied with every stroke, or continuously in time, a refractive index profile comprising one of the varying F-dopant concentrations as described above is obtained. According to the inventors it is also possible to obtain such varying dopant concentrations when using other optical fibre production processes. An example of this is the MCVD process, wherein the gases supplied to the interior of the tube react to form glass layers on the inside of the substrate tube under the influence of an external heat source, wherein the concentration of the raw materials in the gas flow being supplied can be varied with each glass layer that is deposited. The same applies to OVD or VAD. After the deposition of the glass layers, a preform is formed by contracting a hollow tube or sintering the deposited layers of soot. Such a preform is drawn into an optical glass fibre, using heat.

Such multimode optical fibres can also be obtained by using mode coupling. Dutch patent application Ser. No. 1022315 (not pre-published) in the name of the present applicant describes an example of a method in which stress centres are very locally introduced into the fibre, which stress centres arrange for the coupling of the various modes that effect the transmission of the signal in a multimode fibre, so that there will be no differences in the transmission rate of higher-order modes and lower-order modes, and that more or less independently of the refractive index profile. This, too, makes the bandwidth less wavelength-dependent. Also combinations of mode coupling with the doping technique as described above are used in order to obtain multimode optical fibres according to the present invention.

Example 1

A multimode optical fibre comprising a core having a gradient index of refraction in accordance with equation 1, a core diameter of 50.2 µm and an NA of 0.201 was formed. The value of the profile shape parameter α was 1.97. The concentration of fluorine (F) in the core increased from 0 weight percent on the central fibre axis, at r=0, to 4 weight percent at the edge of the core, at r=a.

The bandwidth of said fibre was measured at 850 nm and at a number of wavelengths around 1300 nm, using the method of FOTP-204. The results are presented in the Table 1 (below). Furthermore, the DMD was measured at 1300 nm, the DMD pulse responses did not exhibit any perturbations in the central part.

TABLE 1

| | Wavelength 1 [nm] | | | | | |
| --- | --- | --- | --- | --- | --- | --- |
| | 850 | 1250 | 1270 | 1300 | 1330 | 1350 |
| Bandwidth [MHz · km] | 447 | 2037 | 1979 | 2280 | 2027 | 1829 |

In the illustrated wavelength range around 1300 nm, a minimum bandwidth of 1821 Mhz·km over the entire wavelength range is required in order to be able to guarantee a transmission rate of at least 1 Gbit/sec over a minimum distance of 2000 m. The bandwidths in the wavelength range around 1300 nm of the fibre are thus sufficiently high for providing said transmission capacity.

Comparative Example 1

A multimode optical fibre comprising a core having a gradient index of refraction in accordance with equation 1, a core diameter of 49.9 µm and an NA of 0.202 was formed. The value of the profile shape parameter α was 1.97. The concentration of fluorine (F) in the core was at a constant value of 0.2 weight percent in the fibre core.

The bandwidth of said fibre was measured at 850 nm and at a number of wavelengths around 1300 nm, using the method of FOTP-204. The results are presented in the Table 2 (below). Furthermore, the DMD was measured at 1300 nm, the DMD pulse responses did not exhibit any perturbations in the central part

TABLE 2

| | Wavelength 1 [nm] | | | | | |
| --- | --- | --- | --- | --- | --- | --- |
| | 850 | 1250 | 1270 | 1300 | 1330 | 1350 |
| Bandwidth [MHz · km] | 324 | 993 | 1128 | 2095 | 2257 | 1401 |

The bandwidth of the fibre at wavelengths of 1300 nm and 1330 nm is sufficiently high for a transmission rate of at least 1 Gbit/sec over minimally 2000 m. At the other wavelengths that are shown in the table, the bandwidth is too low for said transmission capacity.

Comparative Example 2

A multimode optical fibre comprising a core having a gradient index of refraction in accordance with equation 1, a core diameter of 50.4 µm and an NA of 0.206 was formed. The value of the profile shape parameter α was 1.93. The concentration of fluorine (F) in the core decreased from 4 weight percent on the central fibre axis, at r=0, to 0 weight percent at the edge of the core, at r=a.

The bandwidth of said fibre was measured at a wavelength of 850 nm and at a number of wavelengths around 1300 nm, using the method of FOTP-204. The results are presented in the Table 3 (below). Furthermore, the DMD was measured at 1300 nm, the DMD pulse responses did not exhibit any perturbations in the central part.

TABLE 3

| | Wavelength 1 [nm] | | | | | |
| --- | --- | --- | --- | --- | --- | --- |
| | 850 | 1250 | 1270 | 1300 | 1330 | 1350 |
| Bandwidth [MHz · km] | 269 | 773 | 1020 | 2354 | 1056 | 629 |

The bandwidth of the fibre at a wavelength of 1300 nm is sufficiently high for a transmission rate of at least 1 Gbit/sec over minimally 2000 m. At the other wavelengths that are shown in the table, the bandwidth is too low for said transmission capacity, however.

Example 2

A multimode optical fibre comprising a core having a gradient index of refraction in accordance with equation 1, a core diameter of 62.3 µm and an NA of 0.269 was formed. The value of the profile shape parameter α was 1.97. The concentration of fluorine (F) in the core increased from 0 weight percent on the central fibre axis, at r=0, to 4 weight percent at the edge of the core, at r=a.

The bandwidth of said fibre was measured at a wavelength of 850 nm and at a number of wavelengths around 1300 nm, using the method of FOTP-204. The results are presented in the Table 4 (below). Furthermore, the DMD was measured at 1300 nm, the DMD pulse responses did not exhibit any perturbations in the central part.

TABLE 4

| | Wavelength 1 [nm] | | | | | |
| --- | --- | --- | --- | --- | --- | --- |
| | 850 | 1250 | 1270 | 1300 | 1330 | 1350 |
| Bandwidth [MHz · km] | 175 | 720 | 820 | 1010 | 904 | 817 |

In the illustrated wavelength range around 1300 nm, a minimum bandwidth of 707 Mhz·km over the entire wavelength range is required in order to be able to guarantee a transmission rate of 1 Gbit/sec over a minimum length of 1000 m. The bandwidths in the wavelength range around 1300 nm of the fibre are thus sufficiently high for providing said transmission capacity Comparative Example 3

A multimode optical fibre comprising a core having a gradient index of refraction in accordance with equation 1, a core diameter of 62.4 µm and an NA of 0.262 was formed. The value of the profile shape parameter α was 1.96. The concentration of fluorine (F) in the core was at a constant value of 1 weight percent in the fibre core.

The bandwidth of said fibre was measured at 850 nm and at a number of wavelengths around 1300 nm, using the method of FOTP-204. The results are presented in the Table 5 (below). Furthermore, the DMD was measured at 1300 nm, the DMD pulse responses did not exhibit any perturbations in the central part.

TABLE 5

| | Wavelength 1 [nm] | | | | | |
| --- | --- | --- | --- | --- | --- | --- |
| | 850 | 1250 | 1270 | 1300 | 1330 | 1350 |
| Bandwidth [MHz · km] | 273 | 522 | 695 | 955 | 909 | 726 |

In the illustrated wavelength range around 1300 nm, a minimum bandwidth of 707 Mhz·km over the entire wavelength range is required in order to be able to guarantee a transmission rate of at least 1 Gbit/sec over a minimum length of 1000 m. The fibre that is shown here does not have this bandwidth over the entire wavelength range of 1250-1350 nm.

Example 3

A multimode optical fibre comprising a core having a gradient index of refraction in accordance with equation 1, a core diameter of 49.7 μm and an NA of 0.198 was formed. The value of the profile shape parameter α was 2.045. The concentration of fluorine (F) in the core increased from 0 weight percent on the central fibre axis, at r=0, to 2 weight percent at the edge of the core, at r=a.

The bandwidth of said fibre was measured at a number of wavelengths around 850 nm and at 1300 nm, using the method of FOTP-204. The results are presented in the Table 6 (below). Furthermore, the DMD was measured at 850 nm, the DMD pulse responses did not exhibit any perturbations in the central part.

TABLE 6

| | Wavelength 1 [nm] | | | | | |
|---|---|---|---|---|---|---|
| | 800 | 820 | 850 | 875 | 900 | 1300 |
| Bandwidth [MHz · km] | 2182 | 2604 | 4880 | 2791 | 2081 | 634 |

In the illustrated wavelength range around 850 nm, a minimum bandwidth of 2000 Mhz·km over the entire wavelength range is required in order to be able to guarantee a transmission rate of 10 Gbit/sec over a minimum length of 300 m. The bandwidths in the wavelength range around 800 nm of the fibre are thus sufficiently high for providing said transmission capacity.

Example 4

A multimode optical fibre comprising a core having a gradient index of refraction in accordance with equation 1, a core diameter of 50.3 μm and an NA of 0.201 was formed. The value of the profile shape parameter α was 2.05. The concentration of fluorine (F) in the core increased from 1 weight percent on the central fibre axis, at r=0, to 2.5 weight percent at the edge of the core, at r=a.

The bandwidth of said fibre was measured at a number of wavelengths around 850 nm and at 1300 nm, using the method of FOTP-204. The results are presented in the Table 7 (below). Furthermore, the DMD was measured at 850 nm, the DMD pulse responses did not exhibit any perturbations in the central part.

TABLE 7

| | Wavelength 1 [nm] | | | | | |
|---|---|---|---|---|---|---|
| | 800 | 825 | 850 | 875 | 900 | 1300 |
| Bandwidth [MHz · km] | 1829 | 2737 | 4860 | 2652 | 1789 | 583 |

In the illustrated wavelength range around 850 nm, a minimum bandwidth of 2000 Mhz·km over the entire wavelength range is required in order to be able to guarantee a transmission rate of 10 Gbit/sec over a minimum length of 300 m. The bandwidths in a wavelength band having a width of at least 50 nm around 850 nm of the fibre that is shown here are sufficiently high for providing said transmission capacity.

Example 5

A multimode optical fibre comprising a core having a gradient index of refraction in accordance with equation 1, a core diameter of 62.7 μm and an NA of 0.274 was formed. The value of the profile shape parameter α was 2.03. The concentration of fluorine (F) in the core increased from 0 weight percent on the central fibre axis, at r=0, to 3 weight percent at the edge of the core, at r=a.

The bandwidth of said fibre was measured at a number of wavelengths around 850 nm and at 1300 nm, using the method of FOTP-204. The results are presented in the Table 8 (below). Furthermore, the DMD was measured at 850 nm, the DMD pulse responses did not exhibit any perturbations in the central part.

TABLE 8

| | Wavelength 1 [nm] | | | | | |
|---|---|---|---|---|---|---|
| | 800 | 820 | 850 | 875 | 900 | 1300 |
| Bandwidth [MHz · km] | 1135 | 1542 | 2056 | 1814 | 826 | 357 |

In the illustrated wavelength range around 850 nm, a minimum bandwidth of 808 Mhz·km over the entire wavelength range is required in order to be able to guarantee a transmission rate of 10 Gbit/sec over a minimum length of 150 m. The bandwidths in a wavelength band having a width of at least 100 nm around 850 nm of the fibre that is shown here are sufficiently high for providing said transmission capacity.

Example 6

A multimode optical fibre comprising a core having a gradient index of refraction in accordance with equation 1, a core diameter of 49.7 μm and an NA of 0.198 was formed. The value of the profile shape parameter α was 2.427. The concentration of fluorine (F) in the core increased from 0 weight percent on the central fibre axis, at r=0, to a maximum value of 6.1 weight percent at r=15.5, after which the concentration of fluorine (F) decreased to a value of 0 weight percent at the edge of the core, at r=a.

The bandwidth of said fibre was measured at a number of wavelengths between 1300 nm and 1550 nm and at 850 nm, using the method of FOTP-204. The results are presented in the Table 9 (below). Furthermore, the DMD was measured at 1300 nm, the DMD pulse responses did not exhibit any perturbations in the central part.

TABLE 9

| | Wavelength 1 [nm] | | | | | | |
|---|---|---|---|---|---|---|---|
| | 850 | 1300 | 1360 | 1400 | 1450 | 1500 | 1550 |
| Bandwidth [MHz · km] | 431 | 1477 | 1386 | 1597 | 1537 | 1344 | 1529 |

In the wavelength range around 1400 nm and especially in the illustrated wavelength range from 1300 nm to 1550 nm, a minimum bandwidth of 1196 Mhz·km over the entire wavelength range is required in order to be able to guarantee a transmission rate of at least 1 Gbit/sec over a minimum length of 1300 m. The bandwidths in a wavelength range around 1400 nm of the fibre are thus sufficiently high for providing said transmission capacity.

Example 7

A multimode optical fibre as mentioned in Example 6 was formed, except that the value of the profile shape parameter α was 2.28 and the maximum concentration of fluorine (F) was 5.4 weight percent.

The bandwidth of said fibre was measured at a number of wavelengths between 1200 nm and 1450 nm, using the method of FOTP-204. The results are presented in the Table 10 (below). Furthermore, the DMD was measured at 1300 nm, the DMD pulse responses did not exhibit any perturbations in the central part.

TABLE 10

| | Wavelength 1 [nm] | | | | | | |
|---|---|---|---|---|---|---|---|
| | 850 | 1200 | 1230 | 1300 | 1360 | 1400 | 1450 |
| Bandwidth [MHz · km] | 546 | 1217 | 1356 | 1267 | 1369 | 1382 | 1275 |

In the wavelength range around 1400 nm and especially in the illustrated wavelength range from 1200 nm to 1450 nm, a minimum bandwidth of 1100 Mhz·km over the entire wavelength range is required in order to be able to guarantee a transmission rate of at least 1 Gbit/sec over a minimum length of 1300 m. The bandwidths in the wavelength range around 1400 nm of the fibre are thus sufficiently high for providing said transmission capacity.

The invention claimed is:

1. A multimode optical fibre having a refractive index profile, comprising a light-guiding core having a diameter of about 50 µm and being surrounded by one or more cladding layers, characterized in that, over a fibre length of at least 150 m, the transmission capacity is at least 10 Gbit/sec over a wavelength band having a width of at least 50 nm in a wavelength range comprising 850 nm.

2. The multimode optical fibre according to claim 1, characterized in that, over a fibre length of at least 150 m, the transmission capacity is at least 10 Gbit/sec over a wavelength band having a width of at least 100 nm in a wavelength range comprising 850 nm.

3. The multimode optical fibre according to claim 1, characterized in that, over a fibre length of at least 300 m, the transmission capacity is at least 10 Gbit/sec over a wavelength band having a width of at least 50 nm in a wavelength range comprising 850 nm.

4. The multimode optical fibre according to claim 1, characterized in that, over a fibre length of at least 300 m, the transmission capacity is at least 10 Gbit/sec over a wavelength band having a width of at least 50 nm in a wavelength range comprising 850 nm.

5. The multimode optical fibre according to claim 1, wherein the multimode optical fibre has a minimum OFL bandwidth of 2000 Mhz·km over the entire width of the 50 nm wavelength band.

6. A multimode optical fibre, comprising:
a gradient index light-guiding core having a diameter of about 50 µm, the gradient index light-guiding core including fluorine having a concentration increasing in a radial direction from a fibre axis (r=0); and
one or more cladding layers surrounding the gradient index light-guiding core;
wherein, over a fibre length of at least 150 m, the transmission capacity of the multimode optical fibre is at least 10 Gbit/sec over a wavelength band having a width of at least 50 nm in a wavelength range that includes 850 nm.

7. The multimode optical fibre according to claim 6, wherein, over a fibre length of at least 150 m, the transmission capacity of the multimode optical fibre is at least 10 Gbit/sec over a wavelength band having a width of at least 100 nm in a wavelength range that includes 850 nm.

8. The multimode optical fibre according to claim 6, wherein, over a fibre length of at least 300 m, the transmission capacity of the multimode optical fibre is at least 10 Gbit/sec over a wavelength band having a width of at least 50 nm in a wavelength range that includes 850 nm.

9. The multimode optical fibre according to claim 6, wherein, over a fibre length of at least 300 m, the transmission capacity of the multimode optical fibre is at least 10 Gbit/sec over a wavelength band having a width of at least 100 nm in a wavelength range that includes 850 nm.

10. The multimode optical fibre according to claim 9, wherein the multimode optical fibre has a minimum OFL bandwidth of 2000 Mhz·km over the entire width of the 100 nm wavelength band.

* * * * *